(12) United States Patent
Filipiak et al.

(10) Patent No.: US 6,530,615 B2
(45) Date of Patent: Mar. 11, 2003

(54) WORKPIECE GRIPPER

(75) Inventors: Michael A. Filipiak, Ann Arbor, MI (US); Mansoor Eslami, Ann Arbor, MI (US)

(73) Assignee: Syron Engineering & Mfg., LLC, Saline, MI (US)

( * ) Notice: Subject to any disclaimer, the term of this patent is extended or adjusted under 35 U.S.C. 154(b) by 0 days.

(21) Appl. No.: 09/761,952

(22) Filed: Jan. 17, 2001

(65) Prior Publication Data

US 2002/0093211 A1 Jul. 18, 2002

(51) Int. Cl.$^7$ .......................... B25J 15/00; B25J 15/04; B66C 1/42
(52) U.S. Cl. ........................ 294/88; 294/116; 294/902; 901/32; 901/37
(58) Field of Search ......................... 294/88, 116, 902, 294/104, 106, 115; 901/37, 39, 32

(56) References Cited

U.S. PATENT DOCUMENTS

| | | | |
|---|---|---|---|
| 3,061,357 A | * 10/1962 | Wright | 294/902 |
| 4,518,187 A | * 5/1985 | Blatt et al. | 294/88 |
| 4,519,279 A | * 5/1985 | Ruggeri | 294/116 |
| 4,529,182 A | * 7/1985 | Valentine | 269/34 |
| 4,728,137 A | * 3/1988 | Hamed et al. | 294/88 |
| 4,886,635 A | * 12/1989 | Forster et al. | 294/116 |
| 4,892,344 A | * 1/1990 | Takada et al. | 294/88 |
| 5,072,652 A | * 12/1991 | Blatt | 294/88 |
| 5,085,480 A | * 2/1992 | Jackson | 294/88 |
| 5,152,568 A | * 10/1992 | Blatt | 294/88 |
| 5,284,375 A | * 2/1994 | Land, III | 294/88 |
| 5,503,378 A | * 4/1996 | Schauss et al. | 269/32 |
| 5,647,625 A | * 7/1997 | Sawdon | 294/902 |
| 5,853,211 A | * 12/1998 | Sawdon et al. | 294/88 |
| 5,938,257 A | * 8/1999 | Blatt | 294/88 |
| 5,938,259 A | * 8/1999 | Sawdon et al. | 294/88 |
| 5,975,605 A | * 11/1999 | Kot | 294/88 |
| 6,048,013 A | * 4/2000 | Moilanen et al. | 294/88 |
| 6,176,533 B1 | * 1/2001 | Moilanen et al. | 294/88 |

FOREIGN PATENT DOCUMENTS

| | | | |
|---|---|---|---|
| DE | 3742782 | 7/1989 | 294/88 |
| JP | 0048447 | 3/1982 | 294/88 |
| SU | 1622278 | 1/1991 | 294/116 |

* cited by examiner

*Primary Examiner*—Christopher P. Ellis
*Assistant Examiner*—Paul T. Chin

(57) ABSTRACT

A fluid pressure actuated gripper employed in automated workpiece handling systems. The gripper clampingly grips and transfers workpieces from one station to another. A pair of jaw members are positioned in the gripper device which has a pressure-actuated mechanism, a base plate and removable side plate members. A pair of axially offset cam pin members attached to the end of a piston rod and actuated by the pressure-actuated mechanism is used to open and close the gripper jaw members. Pivot pins or shafts pivotably connect the jaw members to the side plate members.

12 Claims, 4 Drawing Sheets

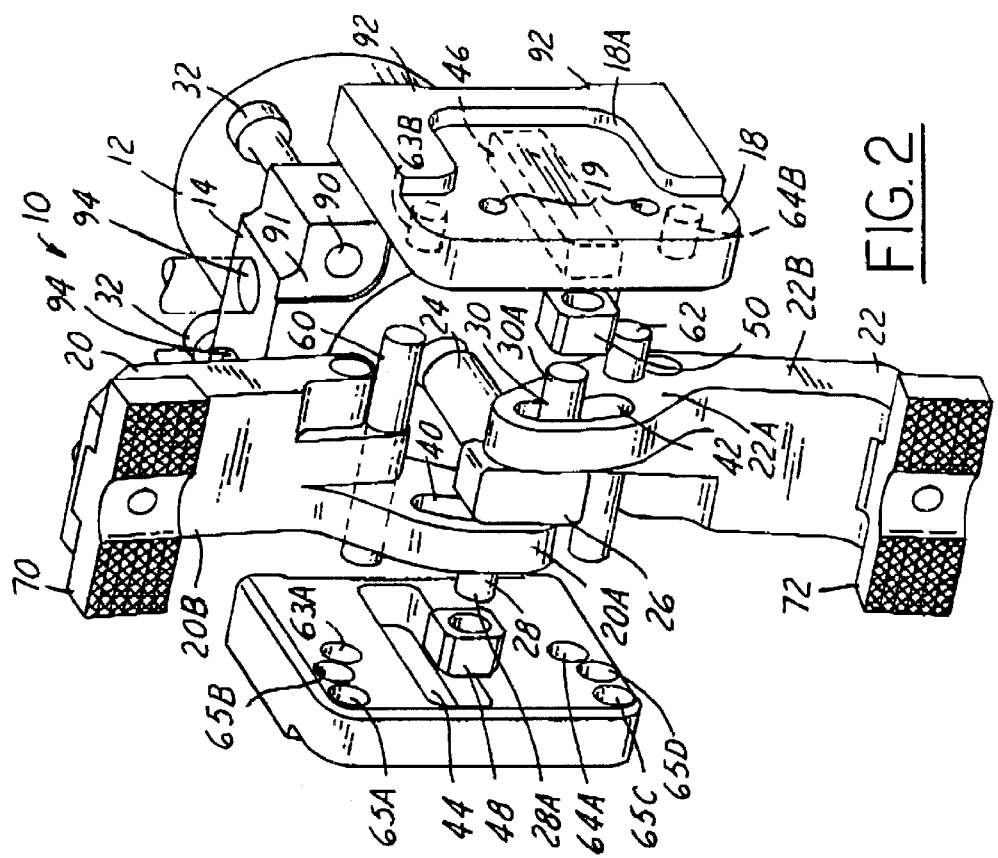
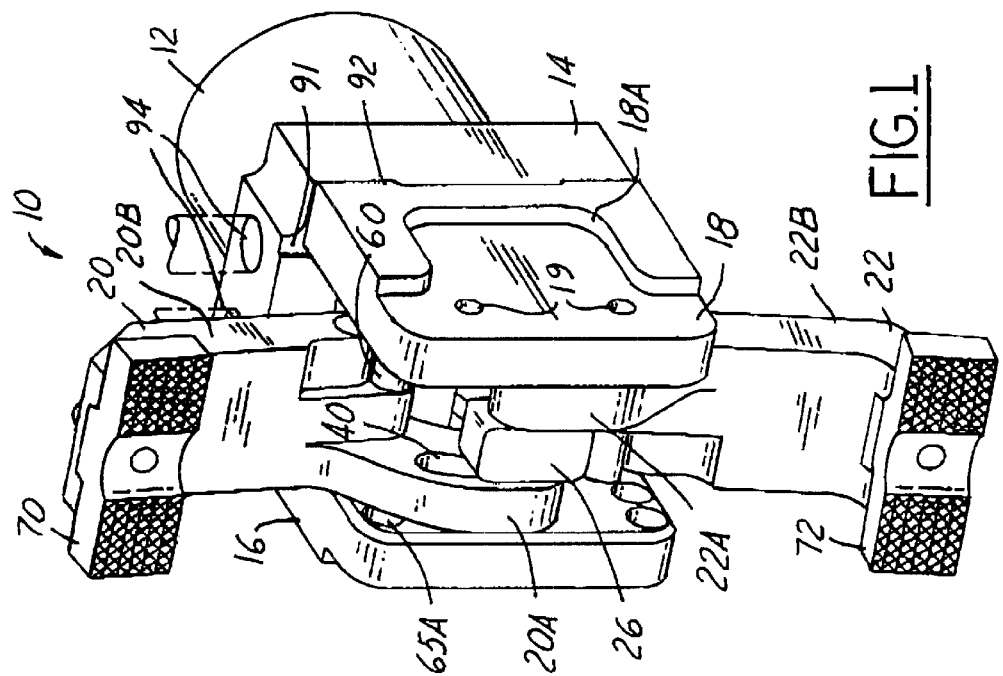

WORKPIECE GRIPPER

TECHNICAL FIELD

The present invention relates to automated workpiece handling devices which clampingly grip and transfer workpieces from one station to another during manufacturing and/or assembly operations.

BACKGROUND

Automated workpiece handling devices (also known as "grippers") are widely employed, typically in the automotive industry, and typically include a fluid pressure-actuated mechanism with one or more gripper jaw members. The fluid pressure actuated mechanism is typically a pneumatic or hydraulic differential motor or the like and is mounted on a robot or other type of workpiece handling or transfer mechanism. One or more moveable gripper jaws are pivotally mounted to a piston rod operated by the fluid pressure actuated mechanism.

When the piston is moved in one direction, the jaws are pivoted to an open position. Upon movement of the piston in the opposite direction, the jaws are driven to a closed workpiece gripping position. These devices are typically utilized to transfer a workpiece in an assembly line or manufacturing operation from one station to another.

In typical operation, the gripper jaws are closed upon a workpiece near or adjacent an edge of the workpiece and the gripper itself is then moved in order to reposition the gripped workpiece in, for example, an adjacent workstation. The gripper is opened at the subsequent workstation to release the workpiece and the process is repeated for subsequent workpieces. In this regard, at the conclusion of the work operation, the gripper device repositions itself back into its initial workstation and the jaws are again activated to close and grip upon a subsequent workpiece and carry it away in the same manner. Opening and closing the gripper jaws takes place when the gripper device is in the closest proximity to the tooling at the workstation.

Known types of linkage arrangements used in fluid pressure actuated grippers to connect the gripper jaws to the piston rods and affect movement thereof are pivotal link arrangements and pivotal cam arrangements. Examples of these arrangements are found, for example, in U.S. Pat. Nos. 5,503,378, 5,152,568, 4,518,187, and 6,048,013.

In a typical production line, there are numerous workstations with one or more fluid pressure actuated gripper devices positioned adjacent or between workstations. During operation, the gripper devices are synchronized so that they simultaneously remove a workpiece from one workstation and transfer the work piece to the next workstation.

Problems can occur if one of the gripper devices fails to properly grip a workpiece and the workpiece slips out of alignment. Other problems can occur if the gripper does not open a sufficient amount in order to clear possible obstacles or satisfactory grip the workpiece, or if a workpiece is transferred in a misaligned manner and subsequently positioned at a workstation in a misaligned fashion. Such incidents can damage the workstation as well as the workpiece. Also, an automatic gripper device can completely lose grip on the workpiece if, for example, there is a leak or failure of the fluid pressure supplied to the actuator.

Fluid pressure actuated grippers are generally designed for use with particular workpieces to be transferred and with specific workstations. For example, some workpieces and workstations may require wider or narrower gripper jaws, different types of gripper jaws, gripper jaws that open at different angles, different clearance requirements, and the like. In many cases, it is important to have the gripper jaws opened as wide as possible, for example 70–90°, in order to satisfactorily grip the workpieces and move them from one workstation to another. It is also important for economic and assembly requirements to provide gripper devices with modular-type components.

Thus, it would be advantageous to provide a fluid pressure actuated gripper device in which the gripper devices have modular components, the gripper jaws can be easily changed and replaced, and the jaws can open to maximum width positions.

SUMMARY OF THE INVENTION

The present invention is directed to fluid pressure actuated gripper devices of the type employed in automated workpiece handling systems which clampingly grip and transfer workpieces from one station to another. The gripper devices of the present invention include a pneumatic or hydraulic cylinder (or "motor") which drives the piston rod in a reciprocal fashion, and a pair of gripper jaws which are operatively attached to the piston rod and affect opening and closing of at least one of the jaws as the piston rod undergoes reciprocal motion. The gripper device includes a base member which is attached to a pressure actuated cylinder and a pair of detachable side plate members. A pivotal cam-type linkage is utilized to open and close one or more of the jaw members. A pair of offset cam pins attached to the reciprocal piston rod member slide in grooves in the side plate members causing the jaw members to move and rotate around pivot members. Cam grooves in the gripper jaws have particular shapes which affects the amount of movement of the jaws and thus the opening and closing of the gripper devices. Pivot shafts or pin members operatively attached to the jaw members are positioned in blind openings in the side plate members and provide pivot axis for the jaw members to rotate when they are operated by the piston rod and cam pins. The pivot pin members can be positioned at various locations in said side plate members in order to preset or control the amount of pivoting of the jaw members and thus the amount of opening of the gripper jaw members. The two cam pins are axially offset from one another and allow the jaw members to open in an extended manner, up to 90°.

A number of components of the gripper device are also modular in that they can be replaced or interchanged with other components to change the degree of movement of the jaw members for different applications.

Alternative embodiments of the present invention include gripper devices in which only one jaw member is operable by the fluid pressure actuated mechanism while the other jaw member remains stationary. In addition, differently shaped cam slots on the jaw members can restrict the opening of the jaw members to various degrees of opening, as desired. Also, various types of gripper tips can be provided on the gripper jaws.

BRIEF DESCRIPTION OF THE DRAWINGS

The present invention will be described hereafter with reference to the attached drawings which are given as non-limiting examples only, in which:

FIG. 1 illustrates a workpiece gripper device in accordance with the present invention;

FIG. 2 is a semi-exploded view of the gripper device illustrated in FIG. 1;

DESCRIPTION OF THE PREFERRED EMBODIMENT(S)

The present invention is directed to fluid pressure actuated gripper devices of the type typically employed in automated workpiece handling devices which clampingly grip and transfer a workpiece from one station to another. The gripper devices of the present invention preferably include a pneumatic or hydraulic mechanism, such as a differential motor, which drives the piston rod in a reciprocal manner, and a pair of gripper jaw members which are operably attached to the piston rod and affect opening and closing of the gripper jaws as the piston rod undergoes reciprocal motion.

Figure 3:
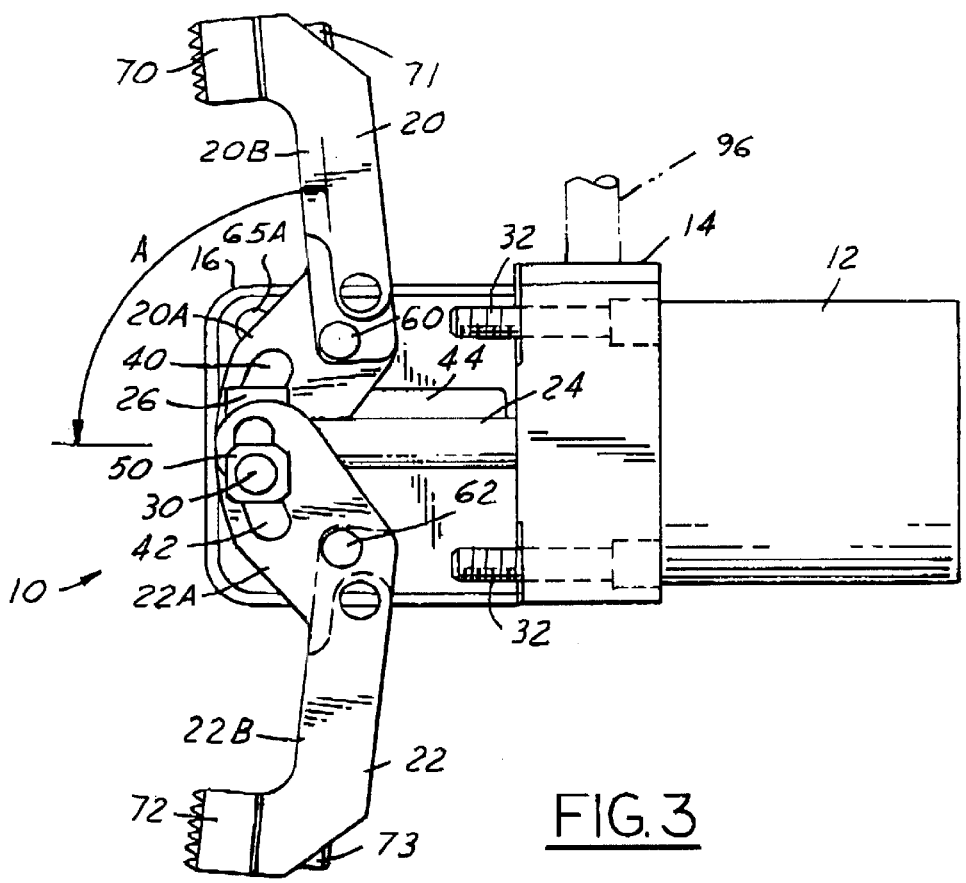
FIG. 3 is a side elevational view of the gripper device shown in FIG. 1, with the gripper jaws being shown in the open position and with one of the side plate members removed.
Figure 4:
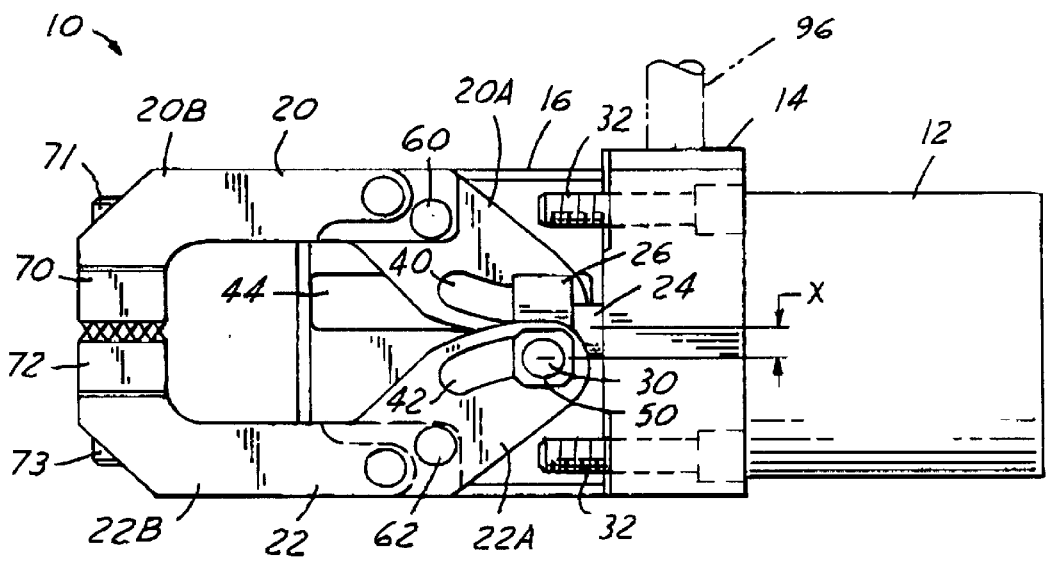
FIG. 4 is a side elevational view of the gripper device shown in FIG. 1, with the gripper jaws being shown in the closed position and with one of the side plate members removed.

A preferred embodiment of the present invention is shown in FIGS. 1–4 and referred to generally by the reference numeral 10. FIG. 1 is a perspective view of the gripper device 10 showing the gripper jaws in the open position, while FIG. 2 illustrates the same device in a semi-exploded condition. FIGS. 3 and 4 are side elevational views of the same embodiment device 10 showing the gripper jaws in the opened and closed positions, respectively.

In general, the gripper device 10 includes a fluid pressure actuated device 12, a base plate member 14, a pair of side plate members 16 and 18, and a pair of gripper jaw members 20 and 22. The fluid pressure actuated cylinder 12 (or "actuator") can be any type of fluid pressure actuated device, such as a pneumatic or hydraulic actuator. A piston rod 24 is actuated in a reciprocal manner by the fluid pressure actuator 12. The cylinder 12 is connected to a conventional source of pneumatic or hydraulic fluid and, together with a control system, is used to actuate the piston rod and in turn the gripper jaws. An end member 26 is attached to the outer end of the piston rod 24 and a pair of cam pins 28 and 30 are attached to the end member 26. In this regard, the two cam pins 28 and 30 are not positioned in axial alignment with each other but are offset from one another. Also, the cam pin members 28 and 30 are positioned offset a distance "X" from the central (longitudinal) axis of the piston rod 24, as shown in FIG. 4, with the cam pins being positioned on opposite sides of the axis. The offset of the cam pains allows more freedom or range of movement of the gripper jaw members and thus allows the jaw members to be opened to a greater extent.

The base member 14 is attached directly to the pressure actuated cylinder 12. The two members can be attached together in any conventional manner, such as the use of fasteners, or by being welded together.

The two side plate members 16 and 18 are secured to the base plate member 14 by a plurality of fasteners 32, such as bolts. In this regard, preferably two bolts or fasteners 32 are utilized to attach each of the end plate members 16 and 18 to the base plate member 14. The removability or detachability of the side plate members 16 and 18 allows ease of mounting and replacement of various types of jaw members in the gripper device 10.

In the preferred embodiment, there are four holes or openings 90 in the base plate member 14, one hole in each of the four corners. This allows the two side plate members 16 and 18 to be positioned along any of the four sides of the base plate member. Also, for ease of positioning and attaching the side plate members onto the base plate members, identical recesses 91 can be provided around each of the openings 90 in each of the four corners of the base plate members. Mating ridges or bosses 92 are provided on the side plate members 16 and 18 which correspond to and mate with the recesses 91.

The side plate members 16 and 18 each have a recessed portion such as that designated 18A in FIG. 1. Adjustable slide plate members 66 (shown in FIG. 8) are positioned in the recessed areas, such as 18A, and secured in place by fasteners, such as bolts or screws, which positioned in openings such as shown at 19 in FIG. 1. The slide plates are positioned relative to the side plate members in order to prevent the edges of the side plate members from coming into contact with the workpiece. For this purpose, the slide plates are preferably made from a tempered or otherwise hard metal. The slide plates can be easily adjusted and replaced as required.

The gripper jaw members 20 and 22 each have body members 20A and 22A, respectively, together with extended arm members 20B and 22B, respectively. The body members 20A and 22A each have elongated slots 40 and 42 therein, respectively. When the jaw members are assembled on the gripper device 10, the cam pins 28 and 30 are positioned in the elongated slots 40 and 42, respectively.

The outer or distal ends 28A and 30A of the cam pins 28 and 30 are positioned in elongated channels or grooves 44 and 46, respectively, in side plate members 16 and 18, respectively (groove 46 is only shown in phantom in FIG. 2). Bushing members 48 and 50 are positioned on the ends 28A and 30A of the cam pins 28 and 30 and also positioned in the grooves 44 and 46. In this regard, the grooves 44 and 46 only protrude partially through the thickness of the side plate members 16 and 18, as shown in the drawings. This assists in retaining the bushing members 48 and 50 in position.

As shown in FIGS. 2–4, the elongated grooves 44 and 46 are oriented parallel to the piston rod member 24. Also, grooves 44 and 46 are offset from one another and positioned on opposite sides of the longitudinal axis of the rod member 24. Both grooves 44 and 46 are offset from the centerline of the rod member the same amount and thus, for modularity, the two side plate members can be interchangeable with each other.

The jaw members 20 and 22 are pivoted by pivot pin members 60 and 62, respectively. The pivot members 60 and 62 are positioned in blind bores or holes 63A and 64A, respectively, in the side plate members 16 and 18, respectively. Preferably, and again for modularity, series of blind bores are provided in each side plate member. These are indicated by reference numerals 65A, 65B, 65C and 65D, together with holes 63A and 64A, in FIG. 2. These holes, together with corresponding holes in the opposed side plate member, allow placement of the pivot pins at various positions, which in turn, allows different degrees of movement and opening of the gripper jaws.

The gripper jaw members 20 and 22 also contain gripper tips 70 and 72, respectively. The gripper tips are used to engage and clampingly grip the workpieces when the gripper devices 10 are utilized. It is to be understood that a wide variety of gripper tips can be used with the gripper devices 10 of the present invention. In this regard, there are many types, sizes and shapes of gripper tips available and in common use today. Examples of these gripper tips are called flange jaw grippers and chisel jaw grippers. The gripper tips 70 and 72 are attached to the jaw members 20 and 22 by fastener members 71 and 73, respectively.

In operation of the gripper device 10, the piston rod 24 is moved or reciprocated in an axial direction by the pneumatic or hydraulic cylinder 12. As the piston rod 24 is extended from the cylinder 12, the resulting interaction between the cam pins 28 and 30 in the slots 40 and 42 in the bodies 20A and 22A relative to the pivot members 60 and 62 operatively rotate the jaw members 20 and 22 to their open position. This is shown in FIGS. 1, 2, and 3. On the other hand, when the piston rod member 24 is withdrawn into the cylinder 12, the respective positions and movement of the cam pins 28 and 30 and pivot members 60 and 62 return the gripper jaw members 20 and 22 to their closed positions. This is shown in FIG. 4.

As indicated, with the present invention, the gripper jaws can rotate to positions up to 90° from their closed or rest positions. This is shown in FIG. 3 and designated by the angle A.

Preferably, all of the components of the gripper device 12 are made from a metal material, such as steel. The cylinder 12 can be of any conventional type, either pneumatic or hydraulic, as desired.

Figure 5:
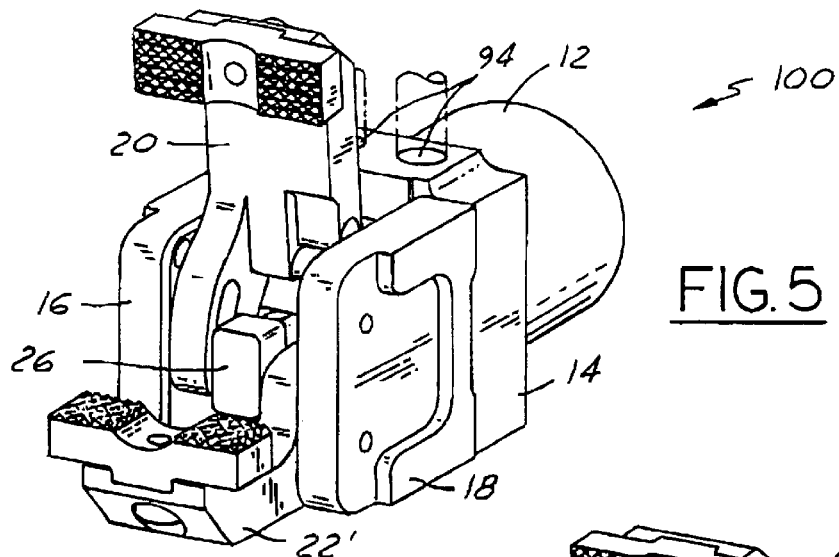
FIG. 5 is a perspective view of an alternate embodiment of a gripper device in accordance with the present invention.
Figure 6:
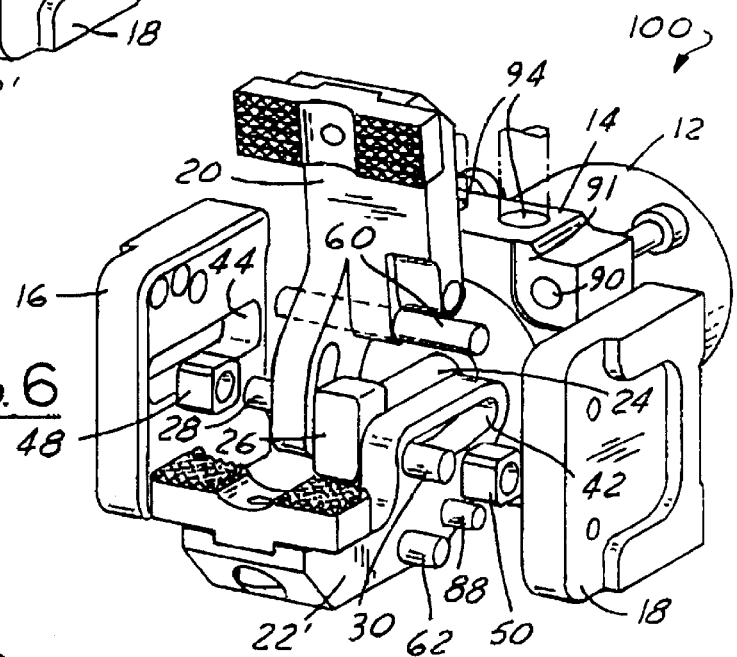
FIG. 6 is a semi-exploded view of the gripper device illustrated in FIG. 5.
Figure 7:
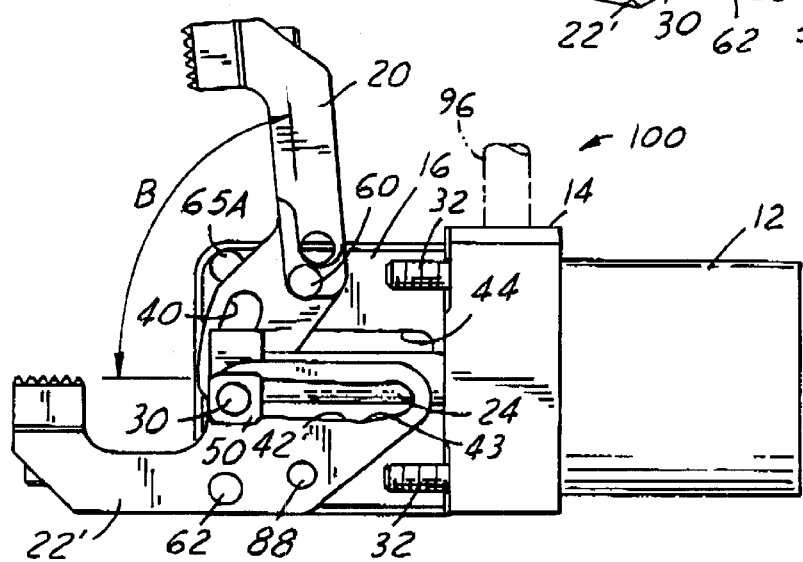
FIG. 7 is a side view of the gripper device shown in FIGS. 5 and 6 in the open position and with one of the side plate members removed.

An embodiment of the present invention in which only one of the jaw members of the gripper device is moveable is shown in FIGS. 5, 6, and 7. In this gripper device embodiment 100, like elements and components of the gripper device 10 are indicated and referred to by the same reference numerals. In the gripper device 100, only the gripper jaw member 20 is moveable or rotatable. The gripper jaw member 22' is stationary.

As shown in FIGS. 6 and 7, the cam slot 42' in jaw member 22' is elongated in a direction parallel to the longitudinal axis of the piston rod 24. In this manner, when the cylinder 12 is actuated and the piston rod member 24 is extended or withdrawn, the cam pin member 30 reciprocates freely in the cam slot 42' and does not cause any rotation or movement of the jaw member 22'.

Again, due to the offset position of the cam pins 28 and 30, the jaw member 20 can be rotated to a position 70–90° from the horizontal or longitudinal axis of the gripper device 100. This is shown by angle B in FIG. 7.

Preferably, the gripper jaw member 22' is not perfectly fixed or stationary, but has a small or limited degree of movement such as 2°. This allows the gripper to grasp and be released more easily from the workpiece. The jaw member 22' also has one or two pin members which protrude transversely from the body portion. Also, the jaw member 22' has a slight bend or arc 43 in the slot 42', and the pin 88 is smaller in diameter then the corresponding blind hole in which it is positioned (in order to allow some "play" or "slop"). This allows the jaw member to have a small degree of movement. The pin 88, also acts as a stop to prevent the jaw member 22' from over rotating or moving more than a small amount from its position. When the gripper jaw member 22' is assembled in the gripper device 100, the pivot pin member 62 is positioned in blind hole 65C and the pin member 88 is positioned in hole 64A.

Figure 8:
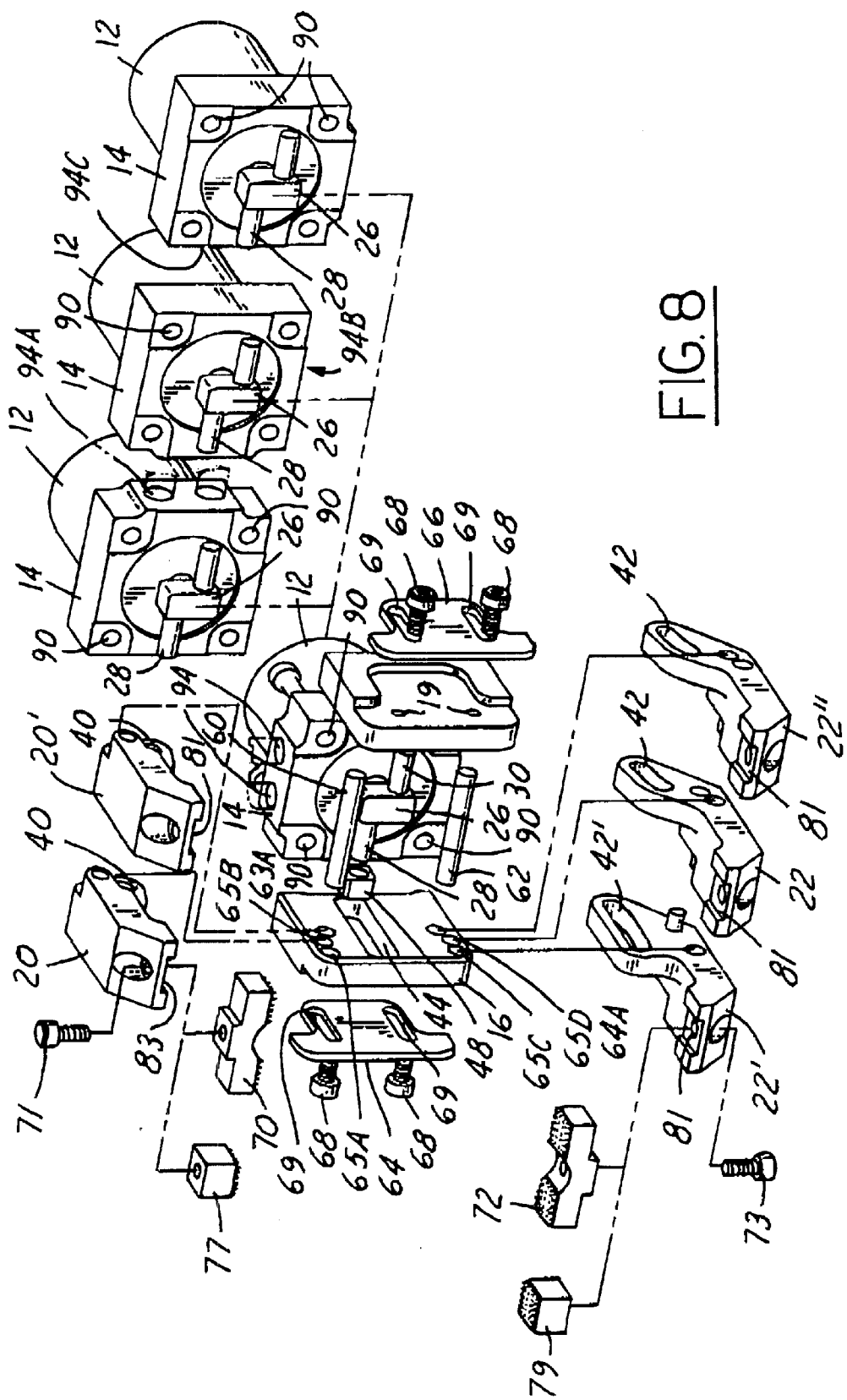
FIG. 8 is an exploded view showing various embodiments and modular components of the present invention.

With the present invention, a number of different jaw members and gripper tips can be used. This is illustrated in FIG. 8. The pivot members for the gripper jaw members can also be positioned at different locations in the side plate members which regulates and changes the opening of the jaw members.

In FIG. 8, components which are the same as those described above with respect to FIGS. 1–7 are indicated by the same reference numerals. For example, base plate 14 is attached to hydraulic or pneumatic cylinder 12. End members 26, together with offset cam pins 28 and 30 are attached to reciprocating piston rod member 24. Slide plates 64 and 66 are shown in their positions where they are attached to side plate members 16 and 18, respectively. Fasteners 68, such as bolts, are used to attach the slide plate members 64 and 66 to the side plate members 16 and 18, respectively. The bolts 68 are positioned in elongated slot 69 in the slide plates 64 and 66 in order to allow the slide plates to be adjustably positioned relative to the side plate members and prevent them from making contact with the workpiece.

A plurality of jaw members 20 and 20', together with jaw members 22, 22' and 22", are positioned between the side plate members and operatively attached to the cam pin members 28 and 30.

Gripper tips 70 and 72 are illustrated, together with one of the various types of alternative gripper tips 77 and 79. As shown in FIG. 8, the gripper tips fit within mating recesses 81 in the jaw members 22, 22' and 22" and recesses 83 in the jaw members 20 and 20'.

As shown in FIG. 8, the jaw members are pivotally attached to the gripper devices by pivot pin members or shafts 60 and 62. Pivot shaft members fit within or through corresponding openings in the jaw members as shown and as described above. A plurality of openings 63A, 65A, 65B, 65C, 65D, and 65E in side plate member 16 and corresponding openings in side plate member 18 allow the shaft members 60 and 62 to be positioned in three different locations relative to the base plate member 14. The two openings or channels 102, 104 shown in jaw members 22 and 22" in FIG. 8 are used to position the pivot pin member 62 in two positions. This affects the degree of movement of the jaw members and thus the degree of opening of the jaws of the gripper device. For example, when the pivot pin is positioned in channel 102, with its ends in hole 65D (or 65B if on top), the gripper jaw member can open to approximately 45°. When the pivot pin is positioned in channel 104, with its ends in hole 64A (or 63A if on top), the jaw member can open to approximately 85°. Additional variations in placement of the channels and blind holes, together with corresponding arcuate shapes of the slots 40 and 42, allow the gripper devices in accordance with the present invention to have ranges of openings between 0° and 90°. These various alternative locations allow the jaw members to be positioned at slightly different positions in the gripper device, thus allowing the gripper members to have different opening capabilities.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A gripper assembly comprising:

a fluid-pressure driven actuator;

a base plate member attached to said actuator;

a pair of side plate members removeably connected to said base plate member, and defining a space therebetween, each of said side plate members having an elongated groove therein;

a piston member actuated by said actuator and extending into said space;

a pair of non-axially aligned cam pin members attached to said piston member, each of said cam pin members having a distal end;

said distal ends of said cam pin members positioned in said elongated grooves in said side plate members; and a pair of opposable jaw members positioned in said space and operably attached to said cam pin members;

each of the Jaw members having an elongated slot therein and wherein one of said cam pin members is positioned in one of said slots.

2. The gripper assembly as described in claim 1 further comprising an end member attached to said piston member and wherein said pair of cam pin members are attached to said end member.

3. The gripper assembly as described in claim 1 further comprising bushing members positioned in said elongated grooves and on said distal ends of said cam pin members.

4. The gripper assembly as described in claim 1 wherein each of said pair of jaw members has a gripper tip thereon.

5. The gripper assembly as described in claim 4 wherein each of said pair of jaw members has a tip seat thereon for positioning of said gripper tip thereon.

6. The gripper assembly as described in claim 1 wherein at least one of said pair of jaw members is operable to be opened by said piston member to 70–90°.

7. The gripper assembly as described in claim 6 wherein each of said pair of jaw members is operable to be opened by said piston member to 70–90°.

8. The gripper assembly as described in claim 1 further comprising pivot members on each of said jaw members, said pivot members rotatably connecting said jaw members to said pair of side plate members to control pivotal movement of said jaw members.

9. The gripper assembly as described in claim 8 wherein said pivot members are positioned in openings in said side plate members.

10. The gripper assembly as described in claim 9 wherein each of said side plate members has a plurality of openings for positioning of said pivot members, wherein the amount of movement of said jaw members can be regulated.

11. The gripper assembly as described in claim 1 further comprising slide plate members attached to each of said pair of side plate members.

12. The gripper assembly as described in claim 1 wherein each of said jaw members has a body portion and a continuously arcuate arm portion.

* * * * *